US011974260B2

(12) United States Patent
Jin et al.

(10) Patent No.: US 11,974,260 B2
(45) Date of Patent: Apr. 30, 2024

(54) METHOD FOR ALLOCATING RESOURCE AND ACCESSING IN OPEN WIRELESS CHANNELS

(71) Applicants: PEKING UNIVERSITY, Beijing (CN); BEIJING XINXING WEITONG TECHNOLOGY CO., LTD., Beijing (CN)

(72) Inventors: Ye Jin, Beijing (CN); Baoji Wang, Beijing (CN); Guocheng Lv, Beijing (CN); Tao He, Beijing (CN); Aimin Liu, Beijing (CN); Mingke Dong, Beijing (CN)

(73) Assignees: PEKING UNIVERSITY, Beijing (CN); BEIJING XINXING WEITONG TECHNOLOGY CO., LTD., Beijing (CN)

(*) Notice: Subject to any disclaimer, the term of this patent is extended or adjusted under 35 U.S.C. 154(b) by 351 days.

(21) Appl. No.: 17/630,925

(22) PCT Filed: Jul. 28, 2020

(86) PCT No.: PCT/CN2020/105100
§ 371 (c)(1),
(2) Date: Jan. 28, 2022

(87) PCT Pub. No.: WO2021/018122
PCT Pub. Date: Feb. 4, 2021

(65) Prior Publication Data
US 2022/0272703 A1 Aug. 25, 2022

(30) Foreign Application Priority Data
Jul. 30, 2019 (CN) .......................... 201910696808.0

(51) Int. Cl.
*H04W 72/04* (2023.01)
*H04B 1/69* (2011.01)
(Continued)

(52) U.S. Cl.
CPC .......... *H04W 72/0453* (2013.01); *H04B 1/69* (2013.01); *H04B 7/18513* (2013.01);
(Continued)

(58) Field of Classification Search
CPC ......... H04W 72/0453; H04W 52/0457; H04W 72/044; H04W 52/046; H04W 72/0466;
(Continued)

(56) References Cited

U.S. PATENT DOCUMENTS

2003/0236854 A1   12/2003  Rom et al.
2017/0337813 A1*  11/2017  Taylor .................. G05D 1/0285
(Continued)

FOREIGN PATENT DOCUMENTS

CN   103944630 A   7/2014
CN   104467945 A   3/2015
(Continued)

OTHER PUBLICATIONS

Hua Lei, Application of Adaptive Coding and Modulation in Satellite Communication, Master's Thesis of Beijing Institute of Technology, 2016, pp. 1-78.

*Primary Examiner* — Phong La
(74) *Attorney, Agent, or Firm* — Bayramoglu Law Offices LLC

(57) ABSTRACT

A method for allocating resource and accessing in open wireless channels includes: covering multiple types of user terminal stations in open wireless channels; making dynamic adaptive matching according to comprehensive change factors of a transmitting end and a receiving end in each communication process. The factors of the transmitting end (Continued)

mean that a type and transmitting capacity of a transmitting station are changed, a current state of the wireless channel between the transmitting station and a relay node is changed, a working state of a receiving end of the relay node is changed, and user services to be transmitted are changed; the factors of the receiving end mean that a type and receiving capacity of a receiving station are changed, a current state of the channel from the relay node to the receiving station is changed, and a working state of a transmitting end of the relay node is changed.

10 Claims, 1 Drawing Sheet

(51) Int. Cl.
*H04B 7/185* (2006.01)
*H04L 1/00* (2006.01)
*H04W 28/06* (2009.01)
*H04W 72/0453* (2023.01)
*H04W 72/08* (2009.01)
*H04W 72/541* (2023.01)

(52) U.S. Cl.
CPC .......... *H04L 1/0003* (2013.01); *H04L 1/0009* (2013.01); *H04W 28/065* (2013.01); *H04W 72/541* (2023.01)

(58) Field of Classification Search
CPC ........... H04W 72/0473; H04W 72/541; H04W 72/54; H04W 72/542; H04W 72/543; H04L 1/0003; H04L 1/0002; H04L 1/0009; H04L 1/1812; H04B 7/18513; H04B 7/1851; H04B 7/18515; H04B 7/18517; H04B 7/18519; H04B 1/69
See application file for complete search history.

(56) References Cited

U.S. PATENT DOCUMENTS

| | | | |
|---|---|---|---|
| 2018/0316416 A1* | 11/2018 | Reis | H01Q 3/02 |
| 2019/0120969 A1* | 4/2019 | Hamzeh | G01S 19/21 |
| 2019/0215058 A1* | 7/2019 | Smyth | H04B 7/18502 |
| 2019/0280763 A1* | 9/2019 | Smyth | H04B 7/18513 |
| 2021/0037392 A1* | 2/2021 | Furuichi | H04W 52/34 |
| 2021/0389474 A1* | 12/2021 | Hamzeh | G01S 19/21 |
| 2022/0052753 A1* | 2/2022 | Speidel | H04W 16/10 |
| 2022/0272703 A1* | 8/2022 | Jin | H04B 7/2041 |
| 2023/0208552 A1* | 6/2023 | Choquette | H04B 7/18513 370/235 |

FOREIGN PATENT DOCUMENTS

| | | | | |
|---|---|---|---|---|
| CN | 110504987 A | | 11/2019 | |
| CN | 110809904 A | * | 2/2020 | .......... H04W 12/069 |
| CN | 109495326 B | * | 12/2021 | .......... H04L 41/0896 |

* cited by examiner

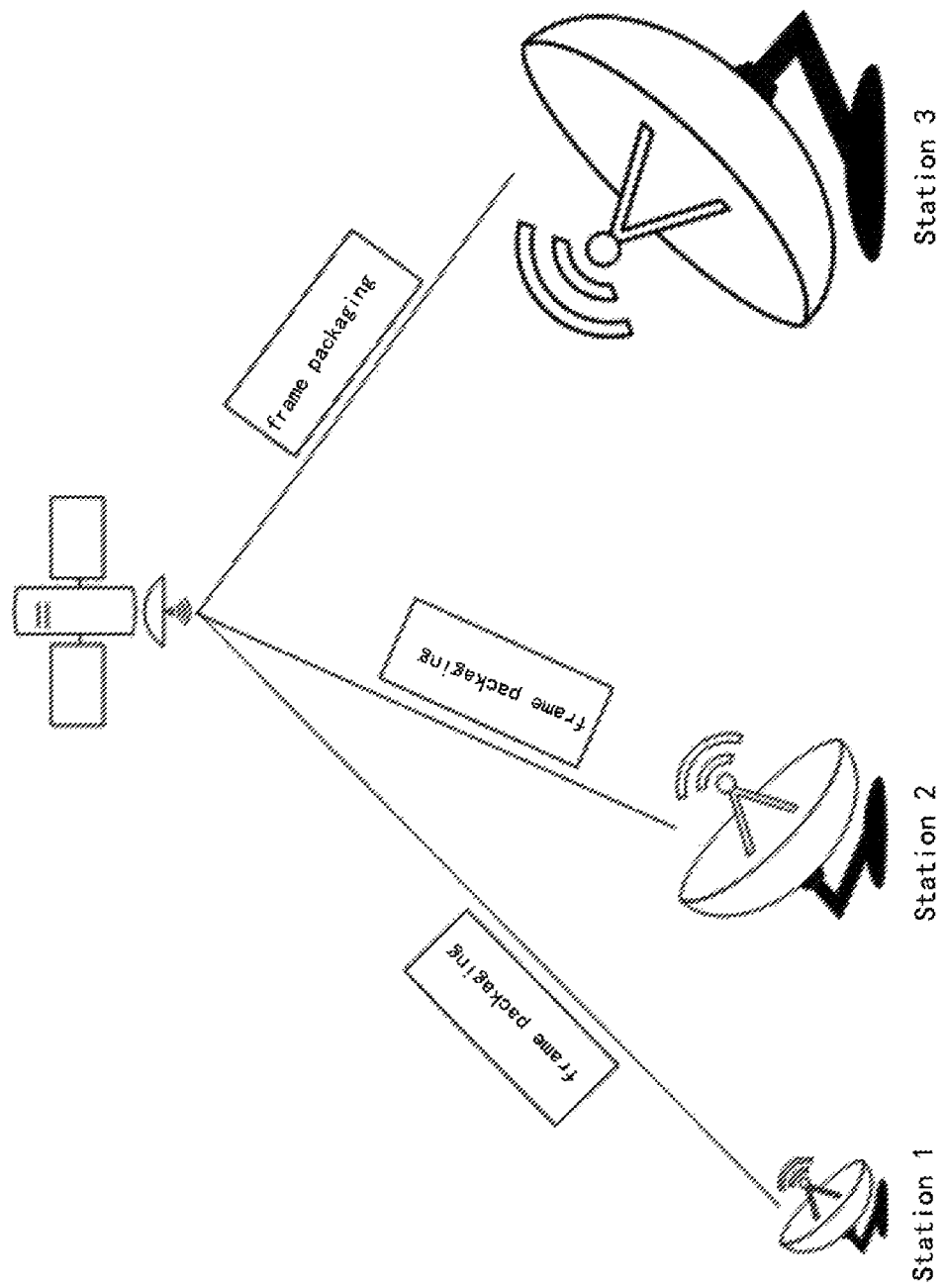

METHOD FOR ALLOCATING RESOURCE AND ACCESSING IN OPEN WIRELESS CHANNELS

CROSS REFERENCE TO THE RELATED APPLICATIONS

This application is the national phase entry of International Application No. PCT/CN2020/105100, filed on Jul. 28, 2020, which is based upon and claims priority to Chinese Patent Application No. 201910696808.0, filed on Jul. 30, 2019, the entire contents of which are incorporated herein by reference.

TECHNICAL FIELD

The invention relates to the technical field of wireless communication, in particular to a method for allocating resource and accessing in open wireless channels.

BACKGROUND

In a satellite communication system, a large number of satellite earth stations form a communication system by satellite transponders. Multiple stations share frequency bands, power, and time resources of the transparent transponders.

Multiple terminal stations adopt many methods of multiple access, such as FDMA, TDMA, and CDMA, to share satellite resources and realize interactive services.

In the access mode of FDMA (Frequency Division Multiple Access) resource is divided according to frequency band to realize satellite resource sharing. FDMA is relatively simple and suitable for mesh and star networking. However, there is intermodulation interference when multiple users adopt FDMA access, which wastes the transponder power and reduces the power utilization efficiency to a certain extent.

In the access mode of CDMA (Time Division Multiple Access) different address codes are allocated to different users to realize satellite resource sharing. CDMA users occupy the same frequency and transmit at the same time. Users are distinguished by the orthogonality of codes. Compared with FDMA, the technology of CDMA is relatively complex and is mostly used in star networking. The user capacity of CDMA depends on the orthogonality of codewords, but the user capacity is limited due to multiple access interference.

In the access mode of TDMA (Time Division Multiple Access) satellite resource is divided according to time slots to realize satellite resource sharing. Different terminal stations occupy different time slots, and service data are transmitted in the form of data bursts. Compared with other multiple access methods, there is no intermodulation problem in TDMA system, it can make full use of satellite power and frequency band, does not need strict power control, and has larger system capacity. It is widely used in satellite communication systems. However, compared with other multiple access systems, the implementation of TDMA communication system is more complex and requires accurate clock synchronization in the whole network. Precise clock synchronization can reduce the interference between users in different time slots and ensure the system capacity. In addition, TDMA is more suitable for networking among stations with the same capability. When TDMA adopts mesh networking with a unified carrier wave, in order to be compatible with the capability of the station with the lowest capability, it is usually necessary to reduce the overall carrier wave rate, which limits the communication capability of other stations with higher capability.

In fact, mesh networks of FDMA or TDMA are mostly suitable for satellite terminal stations with medium transmitting and receiving capacity, and systems of TDM/FDMA or TDM/CDMA are mostly suitable for star networks with a large center station and multiple small terminal stations. The resource allocation and multiple access technology of these satellite systems are different, forming multiple incompatible network systems. Various terminal stations can only be interconnected in this network system, and can only be interconnected with terminal stations in other network systems by a ground network. It has the disadvantages of many types of equipment, high cost and low communication efficiency.

SUMMARY

In order to overcome the defects of the prior art, the technical problem to be solved by the invention is to provide a method for allocating resource and accessing in open wireless channels. It can be compatible with differences and dynamic changes of transmitting terminal stations, receiving terminal stations, relay nodes, wireless channels, and user services in open wireless channels. It can make full use of the open interconnection characteristics of the open wireless channels to realize the adaptive interconnection between terminal stations in the above conditions of differences and dynamic changes. It can avoid dividing terminal stations into mutually separated groups due to the above differences and dynamic changes, avoid adopting different methods for allocating resource and accessing need to be used to solve the interconnection of different types of terminal station groups, and avoid forming a variety of "chimney" information islands that are incompatible with each other and cannot directly establish mutually connected communication links even in an open wireless network.

The technical scheme of the invention is as follows.

This method for allocating resource and accessing in open wireless channels comprises:

covering multiple types of user terminal stations in open wireless channels;

making dynamic adaptive matching with reference to comprehensive change factors of a transmitting end and a receiving end in each communication process; wherein the comprehensive change factors of the transmitting end mean that a type and transmitting capacity of a transmitting station are changed, a current state of the wireless channel between the transmitting station and a relay node is changed, a working state of a receiving end of the relay node is changed, and user services to be transmitted by the transmitting station are changed; the comprehensive change factors of the receiving end mean that a type and receiving capacity of a receiving station are changed, a current state of the channel from the relay node to the receiving station is changed, and a working state of a transmitting end of the relay node is changed.

In the invention, the method includes multiple types of user terminal stations in the open wireless channel and making dynamic adaptive matching with reference to the comprehensive change factors of the transmitting end and the receiving end in each communication process. Therefore, the open wireless channel can be compatible with the differences and dynamic changes of transmitting terminal stations, receiving terminal stations, relay nodes, wireless channels and user services in open wireless channels. It can make full use of the open interconnection characteristics of the open wireless channels to realize the adaptive interconnection between terminal stations in the above conditions of differences and dynamic changes. It can avoid dividing terminal stations into mutually separated groups due to the above differences and dynamic changes, avoid adopting different methods for allocating resource and accessing need to be used to solve the interconnection of different types of terminal station groups, and avoid forming a variety of "chimney" information islands that are incompatible with each other and cannot directly establish mutually connected communication links even in an open wireless network.

BRIEF DESCRIPTION OF THE DRAWINGS

The FIG. 1s a schematic diagram showing an example of a method for allocating resource and accessing in open wireless channels according to the present invention.

DETAILED DESCRIPTION OF THE EMBODIMENTS

As shown in the FIGURE, three satellite stations are selected in the example. Station 1 is a small satellite terminal station with antenna aperture of 0.5 m, power amplifier of 3 W, Station 2 is a medium-sized satellite terminal station with antenna aperture of 1.2 m, power amplifier of 10 W, and Station 3 is a large satellite terminal station with antenna aperture of 3.7 m, power amplifier of 40 W. All three satellite stations work in Ku Band. Ku national beam with 36 MHz bandwidth of Synchronous Satellite 9 is selected as a relay node in open channels, and roll off coefficient of a channel filter is 1.125.

An earth station as a signal transmitting end adopts a unified format of frame packaging, supports a variety of data frame types, adaptively completes information packaging and adaptation according to receiving capacity of a destination receiving station, adaptively selects an information transmission mode according to the receiving capacity of the destination receiving station, and adapts receiving capacity of a receiving end. That is, information in the unified format of frame packaging is transmitted to both Station 2 with high receiving capacity and Station 1 with low receiving capacity. The transmission mode of internal information data frame is defined according to the receiving capacity of the receiving station. The receiving capacity of the receiving station includes downlink EIRP (Equivalent Isotropic Radiation Power), downlink satellite link state (rain attenuation, interference, etc.) and G/T value of the receiving station.

A frame header in the unified format of frame packaging has a strong anti-interference receiving margin, so both Station 2 with high receiving capacity and Station 1 with low receiving capacity can stably and reliably receive the frame header in the unified format of frame packaging. According to the received signal-to-noise ratio of the frame header, power and level of a current information frame can be determined; according to a frame mode field in the frame header, a mode adopted by a subsequent information data frame can be determined, including spread spectrum mode, channel coding mode and channel modulation mode. If a destination address field is included in the frame header, Receiving Station 1 and Receiving Station 2 can determine whether the current data information frame is transmitted to themselves, and decide whether to continue receiving or discard. If Receiving Station 1 or Receiving Station 2 can determine that the current data information frame is transmitted to itself, but it cannot be correctly received or the signal-to-noise ratio of the correctly received signal is very high, indicating that information of the receiving end's receiving ability or channel state known by the transmitter is wrong. Failure to correctly receive indicates that the judgment of the receiving end's capacity is too high, and the signal-to-noise ratio of the received signal is too high which indicates that the judgment of the receiving end's capacity is too low. The receiving end should transmit correct information to the transmitting end to adjust the transmission mode of information data frames. If a destination address field is not included in the frame header, Station 1 and Station 2 can only strive to receive the current data information frame according to the mode field.

At the transmitting end, the invention adopts a multi-dimensional resource allocation method integrating frequency domain, time domain and power domain, which is compatible with the differences of the transmitting stations, including the differences of the transmitting terminal stations, conditions of uplink channels at the transmitting station (rain attenuation and interference), and dynamic variability of uplink working point (saturated flux flow density and G/T value), to realize matching between the characteristics of the transmitting end and uplink channel resources occupied, and ensure the high efficiency of utilizing satellite channel resources.

Scenario 1: if Transmitting Station 3 is a large station (antenna aperture of more than 3.7 m, transmission power of above 40 W, Ku Band) and the uplink is in good condition (no rainfall and no interference), and this transmitting station can make a transponder with Ku Band on the satellite be saturated, then the whole 36 MHz bandwidth and all power of the transponder will be allocated to the transmitting station in the current time slot. According to link calculation results, the transmission rate from Transmitting Station 3 to Receiving Station 2 can be 80 Mbps. The transmission mode adopted is no spread spectrum, channel coding is LDPC code with code length 8064 and code rate 7/8, and channel modulation is 8PSK. The transmission rate from Transmitting Station 3 to Receiving Station 1 can be 32 Mbps. The transmission mode adopted is no spread spectrum, channel coding is LDPC code with code length 8064 and code rate 1/2, and channel modulation is QPSK. If information of Transmitting Station 3 is to be transmitted to Station 1 and Station 2 at the same time, only adopting the rate of 32 Mbps that Station 1 can receive.

Scenario 2: strong rainfall occurs at Transmitting Station 3, and the rain attenuation is 10 dB. At this time, Transmitting Station 3 can only perform about 1/10 of the saturation power of the transponder, and be allocated 4 MHz bandwidth according to the principle of power and bandwidth balance (accounting for 1/8 of the total frequency band, slightly higher than the power proportion). Accordingly, Station 1 and Station 2 should also receive the data transmitted by Transmitting Station 3 in the corresponding 4 MHz frequency band. The transmission rate from Transmitting Station 3 to Receiving Station 2 can be 9 Mbps and the carrier wave bandwidth is 4 MHz. The transmission mode adopted is no spread spectrum, channel coding is LDPC code with code length 8064 and code rate 3/4 and channel modulation is 8PSK. The transmission rate from Transmitting Station 3 to Receiving Station 1 can be 4 Mbps. The transmission mode adopted is no spread spectrum, channel coding is LDPC code with code length 8064 and code rate 1/2, and channel modulation is QPSK. If information of Transmitting Station 3 is to be transmitted to Station 1 and Station 2 at the same time, only adopting the rate of 4 Mbps that Station 1 can receive.

Scenario 3: Station 1 is a transmitting end, and the transmitting capacity of the station can only be 0.7% of the saturation capacity of the satellite transponder. The selected minimum bandwidth is 500 Hz, accounting for 1/64 of the total bandwidth of 32 MHz. The transmission capacity of two Station 1 can correspond to the minimum bandwidth of 500 Hz. Therefore, in the current time slot, 500 Hz is allocated to Station 1 and the spread spectrum with spread spectrum ratio of 2 is adopted. Station 2 and Station 3 shall also receive information transmitted by Station 1 in the corresponding 500 Hz frequency band. The transmission rate from Transmitting Station 1 to Receiving Station 3 can be 375 Kbps and the carrier wave bandwidth is 500 KHz. The transmission mode adopted is that the spread spectrum ratio is 2, channel coding is LDPC code with code length 8064 and code rate 3/4 and channel modulation is QPSK. The transmission rate from Transmitting Station 1 to Receiving Station 2 can be 125 Kbps. The transmission mode adopted is that the spread spectrum ratio is 2, channel coding is LDPC code with code length 8064 and code rate 1/2 and channel modulation is BPSK. If information of Transmitting Station 1 is to be transmitted to Station 3 and Station 2 at the same time, only adopting the rate of 125K bps that Station 2 can receive.

In summary, this method for allocating resource and accessing in open wireless channels comprises:

covering multiple types of user terminal stations in open wireless channels;

making dynamic adaptive matching with reference to comprehensive change factors of a transmitting end and a receiving end in each communication process; the comprehensive change factors of the transmitting end mean that a type and transmitting capacity of a transmitting station are changed, a current state of the wireless channel between the transmitting station and a relay node is changed, a working state of a receiving end of the relay node is changed, and user services to be transmitted by the transmitting station are changed; the comprehensive change factors of the receiving end mean that a type and receiving capacity of a receiving station are changed, a current state of the channel from the relay node to the receiving station is changed, and a working state of a transmitting end of the relay node is changed.

In the invention, the method includes multiple types of user terminal stations in the open wireless channel, and making dynamic adaptive matching with reference to the comprehensive change factors of the transmitting end and the receiving end in each communication process. Therefore, the open wireless channel can be compatible with the differences and dynamic changes of transmitting terminal stations, receiving terminal stations, relay nodes, wireless channels and user services in open wireless channels. It can make full use of the open interconnection characteristics of the open wireless channels to realize the adaptive interconnection between terminal stations in the above conditions of differences and dynamic changes. It can avoid dividing terminal stations into mutually separated groups due to the above differences and dynamic changes, avoid adopting different methods for allocating resource and accessing need to be used to solve the interconnection of different types of terminal station groups, and avoid forming a variety of "chimney" information islands that are incompatible with each other and cannot directly establish mutually connected communication links even in an open wireless network.

Preferably, the resource allocation adopts a dynamic adaptive mode, and redistributes power and frequency resources in each time slot according to dynamic changes of communication requirements and comprehensive transmission capacity of all transmission terminal stations in the whole channel in the same principle.

In the resource allocation mode of the transmitting end in each time slot, each transmitting terminal station transmits data frames in a unified format of frame packaging and transmits them according to the method for allocating resource and accessing in open wireless channels.

Preferably, in the open wireless channels, each transmitting terminal station adopts a unified format of frame packaging when transmitting information to different receiving terminal stations, and the frame packaging is opened according to its own capacity at the destination receiving station to obtain information in the frame. In the unified format of frame packaging, the transmitting terminal station dynamically and adaptively adjusts spread spectrum/frequency hopping mode, channel coding mode, channel modulation mode and source coding mode of an internal information frame according to differences of different receiving terminal stations and dynamic changes of relay nodes and wireless channels, and adapts to the receiving capacity of the receiving ends and the current state of relay nodes and wireless channels, so as to ensure the correct reception of the receiving terminal station.

Preferably, when there are multiple receiving terminal stations corresponding to the unified format of frame packaging, the transmitting terminal station dynamically and adaptively selects the spread spectrum mode, channel coding mode and channel modulation mode of the internal information frame according to the receiving terminal station with the lowest receiving capacity, so as to ensure the correct reception of all receiving terminal stations.

Preferably, in the open wireless channels, when each transmitting terminal station transmits information to different receiving terminal stations, it adopts a single carrier wave in a single frequency band or multiple carrier waves in multiple frequency bands. Each carrier wave transmits a unified format of frame packaging, which adopts a frame header in a standard format. The design of the frame header has a strong anti-interference margin, which is in the range of 10-30 dB. When receiving at the receiving end, the correct reception of the frame header can be guaranteed when the power of the interference and noise signal in the signal frequency band is 10-1000 times higher than the signal power.

Preferably, the frame packaging adopts a frame header in a standard format, and the frame header includes: a synchronization header, a pilot and a frame mode field; the synchronization header is used for timing and carrier wave recovery, and the pilot field is used to eliminate the frequency offset in signal reception; the frame mode field is a key word to realize dynamic adaptive control, which indicates dynamic transmission parameters of the information data frame in the unified frame package: spread spectrum mode, channel coding mode and channel modulation mode. Further, the frame header supports a maximum 1024 times spread spectrum, the length of the synchronization header should not be less than 64*1024 bits, the length of the pilot should not be less than 128*1024 bits, and the length of the frame mode field should not be less than 16*1024 bits according to the number of supported transmission modes.

Preferably, in the open wireless channels, when each transmitting terminal station transmits information to different receiving terminal stations, it adopts a unified format of frame packaging. The frame packaging adopts a frame header in a standard format, and the frame header includes: a synchronization header, a pilot, a frame mode field and a destination terminal station identification part. The synchronization header is used for timing and carrier wave recovery, and the pilot is used to eliminate the frequency offset in signal reception; the frame mode field is a key word to realize dynamic adaptive control, which indicates dynamic transmission parameters of the information data frame in the unified frame package: spread spectrum mode, channel coding mode and channel modulation mode. The destination terminal station identification part is an option in the frame header. Using the destination terminal station identification part can enable many receiving terminal stations to judge whether the current data frame is transmitted to themselves when they receive the frame header and have not received the information data frame. If not, they can discard to save computing resources and power consumption; the length of the destination terminal station identification part is in the range of 4-32 bits. A longer destination terminal station identification part can support a larger address space, which also means more cost for the frame header and lower transmission efficiency.

Preferably, the destination terminal station identification part is an option in the frame header. In the field of satellite communication with open wireless channels, the destination terminal station identification part can be used as an identification of a downlink beam corresponding to the destination terminal station in the scenario that the satellite supports multi beams and has on-board load processing and switching capability. Only by identifying the frame header, the current information frame can be exchanged to the correct downlink beam, and there is no need to demodulate and decode the information data frame, which saves valuable on-board computing resources and power.

Preferably, in the open wireless channels, when each transmitting terminal station transmits information to different receiving terminal stations, the method adopts a unified format of frame packaging to realize dynamic adaptive matching and be compatible with differences of the transmitting end, including differences of transmitting terminal stations, dynamical changes of channel conditions of the transmitting end, and dynamical changes of the capability of the channel relay node (if there is no channel relay node in the open wireless channels, the latter two items are ignored), so as to realize the matching between the characteristics of the transmitting end and the occupied open wireless channel resources, and ensure the high efficiency of utilizing channel resources.

If the transmission power of the transmitting station is equal to or more than the saturation power of the current channel, all frequency bands are allocated to the transmitting station.

If the transmission power of the transmitting station is less than the saturation power of the current channel, a corresponding proportion of the frequency bandwidth in the total bandwidth is allocated according to the principle of power and bandwidth balance. The allocated frequency bandwidth is not less than the minimum bandwidth, and the proportion of the minimum bandwidth to the total bandwidth is in the range of 1/100-1. Multiple transmitting stations that don't monopolize a whole channel are allocated matching frequency bands corresponding to the comprehensive change factors of their transmitting ends, so as to share the current power and frequency band resources.

If the ratio of the transmission power of the transmitting station to the saturation power of the channel is lower than the ratio of the above minimum frequency band to the total bandwidth, the transmitting terminal station do not monopolize a minimum frequency band, and multiple transmitting stations with similar low capacity share a minimum frequency band in the mode of power domain resource allocation.

To the next time slot, according to the same principle, matching with the comprehensive change factors of the transmitting end corresponding to all transmitting stations in the whole channel, and reallocating power and frequency resources.

In the resource allocation modes of the transmitting end in each time slot, each transmitting station transmits data frames in a unified format of frame packaging and transmits them according to the method for allocating resource and accessing in open wireless channels.

Preferably, on a large carrier wave signal monopolizing a single frequency band with power margin, one or more weak signals are superimposed in the form of power domain spread spectrum. If the receiving terminal station correctly receives the large carrier wave signal, it first receives the large carrier wave signal and eliminates it, and then receives the remaining one or more weak signals. If the receiving terminal station is low and cannot correctly receive this large carrier wave signal, it first eliminates the interference of receiving the large carrier wave signal, and then receives the remaining one or more weak signals.

Preferably, the frequency bandwidth allocated in the frequency domain is in the range of 250 kHz-2 GHz.

Further, the time slot length allocated in the time domain is in the range of 1 ms-10000 ms.

Further, the length of the spread spectrum code allocated in the power domain is in the range of 1-1024 bit.

Preferably, the method for allocating resource and accessing in open wireless channels adopts a unified format of frame packaging and a standard frame header that can be reliably received, so that each unified frame packaging is a signal unit that can be transmitted and received independently, does not need additional network synchronization and pilot signals, and can burst in the allocated frequency band and time slot to realize correct reception. In each time slot, the frequency band and power allocation can be dynamically and adaptively adjusted to support the dynamic adaptive attributes of the whole resource allocation and access of the method. The transmitting end and receiving end are dynamically interconnected at data frame level without depending on a reference station or a center station. Interconnection links can be dynamically established between various types of terminal stations requesting communication. An interconnected network form can be dynamically adjusted as needed in a direct mode of one to one, one to many, many to one, many to many one-hop, or a two-hop transfer mode through a gateway node station, so as to realize the dynamic adaptive adjustment of network link form.

Preferably, the method adopts an auxiliary method for piloting from bypass in the network to provide synchronization services of network level for all terminal stations in the channel.

The method further includes:

selecting a terminal station as a reference in open wireless channels, and transmitting a pilot signal; occupying all or some frequency bands of open wireless channels to transmit the pilot signal; wherein all or some frequency bands of open wireless channels occupied by the pilot signal are pilot bands, and the proportion of power of the pilot signal to the total power of the pilot frequency bands is 0.1%0-5%; spreading with a spread spectrum code and superimposing on a communication signal in the pilot frequency bands in a low power spectrum signal mode similar with noise when the pilot signal is transmitted, wherein the influence on the received signal-to-noise ratio of the receiving end signal is lower than that on the background thermal noise of the receiving end, wherein the pilot signal provides pilot, carrier wave and clock synchronization, standard timing and indication information for network construction and mutual communication of multiple types of terminal stations in channels.

Preferably, the unified format of frame packaging adopts the frame header of the standard format and can adaptively adjust the dynamic data information frame. The adaptively adjusted parameters include spread spectrum ratio, channel coding mode, channel modulation mode, the receiving capacity of the receiving end adapting and the state of the current relay node and wireless channel; wherein the spread spectrum ratio is in the range of 1-1024 bits, channel coding is LDPC (Low-Density Parity-Check) code with the code length of 8064, the code rate is 1/4, 1/2, 3/4, 7/8, 15/16, 31/32, or with the code length of 1008, the code rate is 1/4, 1/2, 3/4, 7/8, and the channel modulation modes include BPSK, QPSK, 8PSK, 16APSK, 32APSK, 64APSK, 128APSK, 256APSK.

Preferably, the transmitting and receiving capability information of each terminal station and the dynamic channel parameters of the open wireless channel are collected as the basis for allocating resources. Each terminal station needs to detect and declare its capability of transmitting and receiving by transmitting information frames. When establishing communication connection, it also needs to transmit an application and get a confirmation of the system. The measurement and collection of the information and the coordinated allocation of resources are completed by the exchange of network management information frames or signaling frames. By presetting frequency band, time slot and power resources in the open wireless channels for the transmission of these network management information frames or signaling frames; setting a minimum frequency band as the corresponding signaling frequency band, different terminal stations share this signaling frequency band with different spreading codes or different spreading code phases; allocating wider signaling frequency bands when there are many terminal stations and signalings.

Preferably, the response and processing of network signaling adopts a central and centerless mode.

In the central mode, presetting or selecting a terminal station as a network management station; each terminal station completing the measurement of transmitting and receiving capacity, channel dynamic state and communication application by the interaction of signaling frames with the network management station, which collects and publishes the information, and completes resource allocation and access control.

In the centerless mode, each terminal station transmits and receives signaling frames to and from each other by spontaneous self-transmitting and self-receiving of signaling frames or dynamically selecting corresponding terminal stations, completes the measurement of transmitting and receiving capacity and channel dynamic state, notifies other terminal stations by broadcast signaling, and completes the transmitting and receiving capacity information of each terminal station in the channel, as well as the collection and synchronization of dynamic channel parameters of the open wireless channel. Each terminal station transmits a communication application randomly and completes the process of the resource allocation and communication in the unified rules of the method for allocating resource and accessing in open wireless channels.

Preferably, an auxiliary method for piloting from bypass in a network can be adopted to improve the performance and efficiency of the method for allocating resource and accessing in open wireless channels. The steps are as follows:

(1) selecting a terminal station as a reference in open wireless channels, and sending a pilot signal; wherein the pilot signal from bypass occupying the whole bandwidth of the satellite transponder in a mode of spread spectrum, but only occupying a small amount of power of 1% of the saturation power value of the satellite channel, so as to provide pilot, carrier wave and clock synchronization, and standard timing for various types of terminal stations in the channel to construct networks and communication with each other. The spread spectrum ratio of the pilot signal is 4000, which has strong anti-interference signal characteristics. It is superimposed on the communication signal in the transponder channel in the low power spectrum signal mode like noise, and the influence on the received signal-to-noise ratio of the signal at the receiving end is much lower than that on the thermal noise at the receiving end. In the condition that the power of the satellite channel is completely occupied by other signals (such as Scenario 1), it can also ensure the reliable reception of the pilot signal by each receiving end in the channel.

(2) In the example, Station 3 with the strongest capacity is selected as a reference station to transmit the pilot signal from bypass with bandwidth of 32 MHz, spread spectrum ratio of 4000 and information rate of 4 Kbps. Station 1 and Station 2 can receive the pilot signal from bypass and obtain the reception result of the pilot signal, and combine with the dynamic indication information in the pilot signal frame, including network access information of each terminal station, working state information of terminal stations, satellite and satellite channel monitoring information, network management information, service information and security tips. Relying on the reception and processing of the pilot signal, Station 1 and Station 2 can synchronize with the carrier wave and clock of Reference Station 3, establish a time reference, measure the absolute distance, and distance change between the terminal station and the reference station, and receive the update of the reference station on the satellite spatial position and position change. Carrier wave and clock synchronization, time reference and distance can significantly improve the performance of link establishment, communication maintenance, fault recovery and dynamic adjustment of Station 1 and Station 2 and other terminal stations, and improve the resource utilization and operation reliability of the whole system.

(3) When Station 1 or Station 2 need to apply for resource transmission services, they can apply for transmission of frequency band, time slot h and/or power to Reference Station 3, which is the central mode in the method for allocating resource and accessing in open wireless channels according to the present invention.

Preferably, in Scenario 2, when Station 3 does not make full use of power resources, one or more transmission signals of small stations like Station 1 can be allocated and superimposed on the transmission signals of Station 3 within 4 MHz bandwidth in a mode of power domain spread spectrum, and each receiving terminal station can eliminate the transmission signals of Station 3 by means of interference cancellation, and then receive one or more spread spectrum signals of small stations like Station 1.

Preferably, when the resource allocation adopts the central mode, the network management center station is not fixed, and terminal stations with certain transmitting and receiving capability are alternative network management center stations. After the current network management center station fails or exits, other terminal stations can automatically take over by competition or predetermined sequence according to the rules to become a new network management center station, which is responsible for the establishment and maintenance of the whole network communication link. The robustness of the whole system operation and management is significantly improved.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A method for allocating resource and accessing in open wireless channels, comprising:
    covering multiple types of user terminal stations in the open wireless channels; and
    making dynamic adaptive matching with reference to comprehensive change factors of a transmitting end and comprehensive change factors of a receiving end in each communication process,
    wherein the comprehensive change factors of the transmitting end comprise changes of the following: a type and transmitting capacity of a transmitting station, a current state of the open wireless channels between the transmitting station and a relay node is, a working state of a receiving end of the relay node, and user services to be transmitted by the transmitting station; and
    the comprehensive change factors of the receiving end comprise changes of the following: a type and receiving capacity of a receiving station, a current state of the open wireless channels from the relay node to the receiving station, and a working state of a transmitting end of the relay node;
    adopting a multi-dimensional resource allocation method integrating a frequency domain, a time domains and a power domain, matching the comprehensive change factors of the transmitting end, comprising the changes of the type and transmitting capacity of the transmitting station, the changes of the current state of the wireless channels between the transmitting station and the relay node, the changes of the working state of the receiving end of the relay node, and the changes of the user services to be transmitted by the transmitting station;
    allocating all frequency bands to the transmitting station if a transmission power of the transmitting station is equal to or more than a saturation power of a current channel;
    allocating a corresponding proportion of a frequency bandwidth in a total bandwidth according to a principle of power and bandwidth balance if the transmission power of the transmitting station is less than the saturation power of the current channel, wherein an allocated frequency bandwidth is not less than a minimum bandwidth, and a proportion of the minimum bandwidth to the total bandwidth is in a range of 1/100-1;
    allocating matching frequency bands to multiple transmitting stations to share a current power and frequency band resources, wherein the multiple transmitting stations do not monopolize a whole channel corresponding to the comprehensive change factors of corresponding transmitting ends;
    the multiple transmitting terminal stations do not monopolize a minimum frequency band, and the multiple transmitting stations with similar low capacity share the minimum frequency band in a mode of power domain resource allocation, if a ratio of the transmission power of the transmitting station to the saturation power of the current channel is lower than the proportion of the minimum frequency bandwidth to the total bandwidth;
    to a next time slot, according to the same principle, matching with the comprehensive change factors of the transmitting end corresponding to all the transmitting stations in the open wireless channels, and reallocating power and frequency resources;
    in a resource allocation mode of the transmitting end in each time slot, each of the transmitting stations transmits data frames in a unified format of frame packaging and transmits the data frames according to the method for allocating the resource and accessing in the open wireless channels.

2. The method according to claim 1, further comprising:
    adopting a unified format of frame packaging when each of transmitting terminal stations transmits information to different receiving terminal stations in the open wireless channels;
    opening the frame packaging according to a capacity of a destination receiving station at the destination receiving station to obtain information in the frame packaging;
    adjusting dynamically and adaptively a spread spectrum mode, a channel coding mode, and a channel modulation mode of an internal information frame at the transmitting terminal station in the unified format of the frame packaging for the comprehensive change factors of different receiving ends and dynamic changes of relay nodes and the open wireless channels;
    adapting for the comprehensive change factors of the corresponding receiving ends, so as to ensure a correct reception of the receiving terminal station.

3. The method according to claim 2, further comprising:
    matching the transmitting terminal station according to the receiving terminal station with a worst effect of a receiving capacity of the comprehensive change factors at the receiving end, when there are multiple receiving terminal stations corresponding to the unified format of the frame packaging;
    selecting dynamically and adaptively the spread spectrum mode, the channel coding mode, and the channel modulation mode of the internal information frame, so as to ensure the correct reception of all the receiving terminal stations.

4. The method according to claim 3, further comprising:
    adopting a single carrier wave in a single frequency band or multiple carrier waves in multiple frequency bands in the open wireless channels when each of the transmitting terminal stations transmits information to the different receiving terminal stations; and
    transmitting the unified format of the frame packaging on the single carrier wave or on each of the carrier waves, wherein the frame packaging adopts a frame header in a standard format and a design of the frame header has an anti-interference margin, wherein the anti-interference margin is in a range of 10-30 dB.

5. The method according to claim 4, wherein
the frame header comprises: a synchronization header, a pilot field, and a frame mode field;
the synchronization header is configured for timing and carrier wave recovery,
the pilot field is configured for eliminating a frequency offset in signal reception;
the frame mode field is a key word to realize dynamic adaptive control, indicating dynamic transmission parameters of the internal information frame in the unified format of the frame packaging, and the dynamic transmission parameters of the internal information frame comprise the spread spectrum mode, the channel coding mode, and the channel modulation mode.

6. The method according to claim 5, wherein the frame packaging comprises a destination terminal station identification part; and a length of the destination terminal station identification part is in a range of 4-32 bits.

7. The method according to claim 6, wherein
the destination terminal station identification part is in a communication field of a satellite with the open wireless channels;
the destination terminal station identification part is used as an identification of a downlink beam corresponding to a destination terminal station in a scenario that the satellite supports multi beams and has on-board load processing and switching capability.

8. The method according to claim 1, further comprising superimposing one or more weak signals on a large carrier wave signal monopolizing a single frequency band with a power margin in a form of a power domain spread spectrum; receiving and eliminating the large carrier wave signal, and receiving a remaining of the one or more weak signals if the receiving terminal station correctly receives the large carrier wave signal; eliminating an interference of the large carrier wave signal received, and receiving the remaining of the one or more weak signals if the receiving terminal station is low and cannot correctly receive the large carrier wave signal.

9. The method according to claim 8, wherein
the frequency bandwidth allocated in the frequency domain is in a range of 250 kHz-2 GHz;
a time slot length allocated in the time domain is in a range of 1-10000 ms;
1-10000 ms length of the spread spectrum code allocated in the power domain is in a range of 1-1024 bits.

10. A method for allocating resource and accessing in open wireless channels, comprising:
covering multiple types of user terminal stations in the open wireless channels;
making dynamic adaptive matching with reference to comprehensive change factors of a transmitting end and comprehensive change factors of a receiving end in each communication process,
wherein the comprehensive change factors of the transmitting end comprise changes of the following: a type and transmitting capacity of a transmitting station, a current state of the open wireless channels between the transmitting station and a relay node, a working state of a receiving end of the relay node, and user services to be transmitted by the transmitting station; and the comprehensive change factors of the receiving end comprise changes of the following: a type and receiving capacity of a receiving station, a current state of the open wireless channels from the relay node to the receiving station, and a working state of a transmitting end of the relay node;
wherein the dynamic adaptive matching comprises:
allocating all frequency bands to the transmitting station if a transmission power of the transmitting station is equal to or more than a saturation power of a current channel;
allocating a corresponding proportion of a frequency bandwidth in a total bandwidth according to a principle of power and bandwidth balance if the transmission power of the transmitting station is less than the saturation power of the current channel, wherein an allocated frequency bandwidth is not less than a minimum bandwidth, and a proportion of the minimum bandwidth to the total bandwidth is in a range of 1/100-1;
allocating matching frequency bands to multiple transmitting stations to share a current power and frequency band resources,
wherein the multiple transmitting stations do not monopolize a whole channel corresponding to the comprehensive change factors of corresponding transmitting ends;
the multiple transmitting terminal stations do not monopolize a minimum frequency band, and the multiple transmitting stations with similar low capacity share the minimum frequency band in a mode of power domain resource allocation, if a ratio of the transmission power of the transmitting station to the saturation power of the current channel is lower than the proportion of the minimum frequency bandwidth to the total bandwidth;
selecting information transmission modes adaptively according to a receiving capacity of a destination receiving station after determining occupied satellite channel resources according to the transmitting end;
completing information packaging and adaptation;
determining transmission modes of information data frames according to the receiving capacity of the receiving station,
wherein the receiving capacity of the receiving station comprises downlink EIRP, downlink satellite link state, and G/T value of the receiving station; the transmission modes of the information data frames comprise: a spread spectrum mode, a channel coding mode, and a channel modulation mode;
indicating dynamic changes of the transmission modes by a data frame header, wherein the receiving station determines the transmission modes adopted by the subsequent information data frame according to a mode part in the frame header, and determines whether the receiving station is able to correctly receive current data frame; and
receiving the current data frame when reception conditions are met.

* * * * *